(12) United States Patent
Wang et al.

(10) Patent No.: US 9,063,596 B2
(45) Date of Patent: Jun. 23, 2015

(54) MULTI-TOUCH POSITIONING METHOD

(71) Applicant: NOVATEK Microelectronics Corp., Hsin-Chu (TW)

(72) Inventors: Shun-Li Wang, Hsinchu (TW); Chun-Chieh Chang, Hsinchu (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 155 days.

(21) Appl. No.: 13/686,929

(22) Filed: Nov. 28, 2012

(65) Prior Publication Data

US 2013/0141368 A1 Jun. 6, 2013

(30) Foreign Application Priority Data

Dec. 1, 2011 (TW) .............................. 100144193 A (51) Int. Cl.
*G06F 3/041* (2006.01)
*G06F 3/044* (2006.01)

(52) U.S. Cl.
CPC ................ *G06F 3/041* (2013.01); *G06F 3/044* (2013.01)

(58) Field of Classification Search
CPC ....................................................... G06F 3/041
USPC ....................................................... 345/173
See application file for complete search history.

(56) References Cited

U.S. PATENT DOCUMENTS

| 4,087,625 A | 5/1978 | Dym | |
|---|---|---|---|
| 2001/0050672 A1* | 12/2001 | Kobayashi | 345/158 |
| 2009/0225044 A1* | 9/2009 | Jeon et al. | 345/173 |
| 2010/0309167 A1* | 12/2010 | Nam | 345/174 |
| 2011/0074731 A1* | 3/2011 | Inoue et al. | 345/174 |
| 2011/0141051 A1* | 6/2011 | Ryu | 345/173 |
| 2012/0062506 A1* | 3/2012 | Chae et al. | 345/174 |
| 2012/0105355 A1* | 5/2012 | Souchkov | 345/174 |

FOREIGN PATENT DOCUMENTS

| CN | 101925872 A | 12/2010 |
|---|---|---|
| TW | 201102886 | 1/2011 |
| TW | 201122951 | 7/2011 |
| TW | 201140417 | 11/2011 |

OTHER PUBLICATIONS

W. R. Bennett, "Methods of Solving Noise Problems", 1956, "Proceedings of the IRE".*
Dimitri P. Bertsekas, "Introduction to Probability", 2008.*

* cited by examiner

*Primary Examiner* — Aneeta Yodichkas
*Assistant Examiner* — Neil Wood
(74) *Attorney, Agent, or Firm* — Winston Hsu; Scott Margo (57) ABSTRACT

A multi-touch positioning method for a touch control device is disclosed. The touch control device includes a plurality of sensing channels, and each of the plurality of sensing channels is interlaced by a first sensing electrode and a second sensing electrode. The multi-touch positioning method includes retrieving a first touch sensing value and a second touch sensing value respectively corresponding to the first sensing electrode and the second sensing electrode, adding the first touch sensing value and the second touch sensing value to generate a sensing sum value, determining a touch sensing channel having a local maximum value according to the plurality of sensing sum values of the plurality of sensing channels, so as to define a touch point on the touch sensing channel, and calculating a coordinate of the touch point according to the touch sensing channel and its neighboring sensing channels.

9 Claims, 10 Drawing Sheets

MULTI-TOUCH POSITIONING METHOD

BACKGROUND OF THE INVENTION

1. Field of the Invention

The present invention relates to a multi-touch positioning method, and more particularly, to a multi-touch positioning method for a touch control device.

2. Description of the Prior Art

A touch control display device has been widely utilized among electrical products. The touch control display device is composed by a display panel and a transparent touch panel. Through attachment of the display panel to the transparent touch panel, the touch control display device can realize functions of touch control as well as display. Nowadays, capacitive touch control is the most popular technique.

Figure 1:
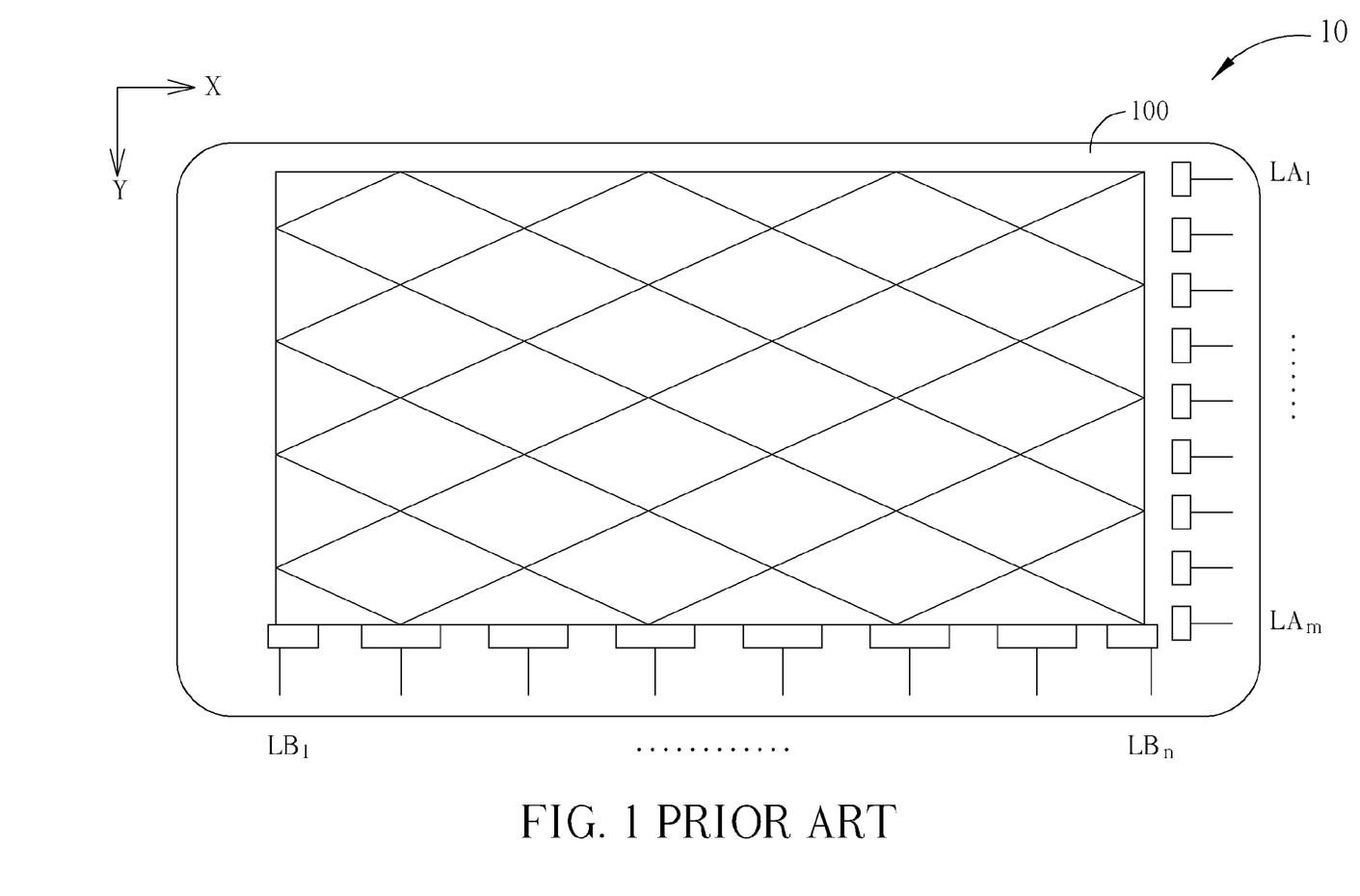
FIG. 1 illustrates a schematic diagram of a conventional capacitive touch control display device according to an embodiment of the invention.

Please refer to FIG. 1, which illustrates a schematic diagram of a conventional capacitive touch control display device 10. As shown in FIG. 1, the capacitive touch control display device 10 includes a touch control sensing glass 100 and a flexible circuit board (not shown in figure), and the touch control sensing glass 100 is interlaced by Indium Tin Oxide (ITO) to form a sensing array at its surface. Further, when a human being (object) touches the touch control display device, the human being and the sensing array form a coupling capacitor, where the sensing array is interlaced by vertical-axis (X-axis) sensing lines $LA_1$-$LA_m$ and horizontal-axis (Y-axis) sensing lines $LB_1$-$LB_n$ to sense capacitance changes of the coupling capacitor, so as to calculate a coordinate of a touch point. In order to simultaneously retrieve the capacitance changes of the coupling capacitor both at the vertical axis as well as the horizontal axis, the sensing array needs to be stacked with two layers of Indium Tin Oxide to form the vertical-axis sensing lines $LA_1$-$LA_m$ and the horizontal-axis sensing lines $LB_1$-$LB_m$ and to provide better calculating accuracy of the coordinate of the touch point. However, the above process needs to utilize a plurality of layers of Indium Tin Oxide and costs a lot. During the process of stacking the sensing array, higher accuracy is needed to qualify an applicable range of the capacitive touch control display device 10.

Figure 2A:
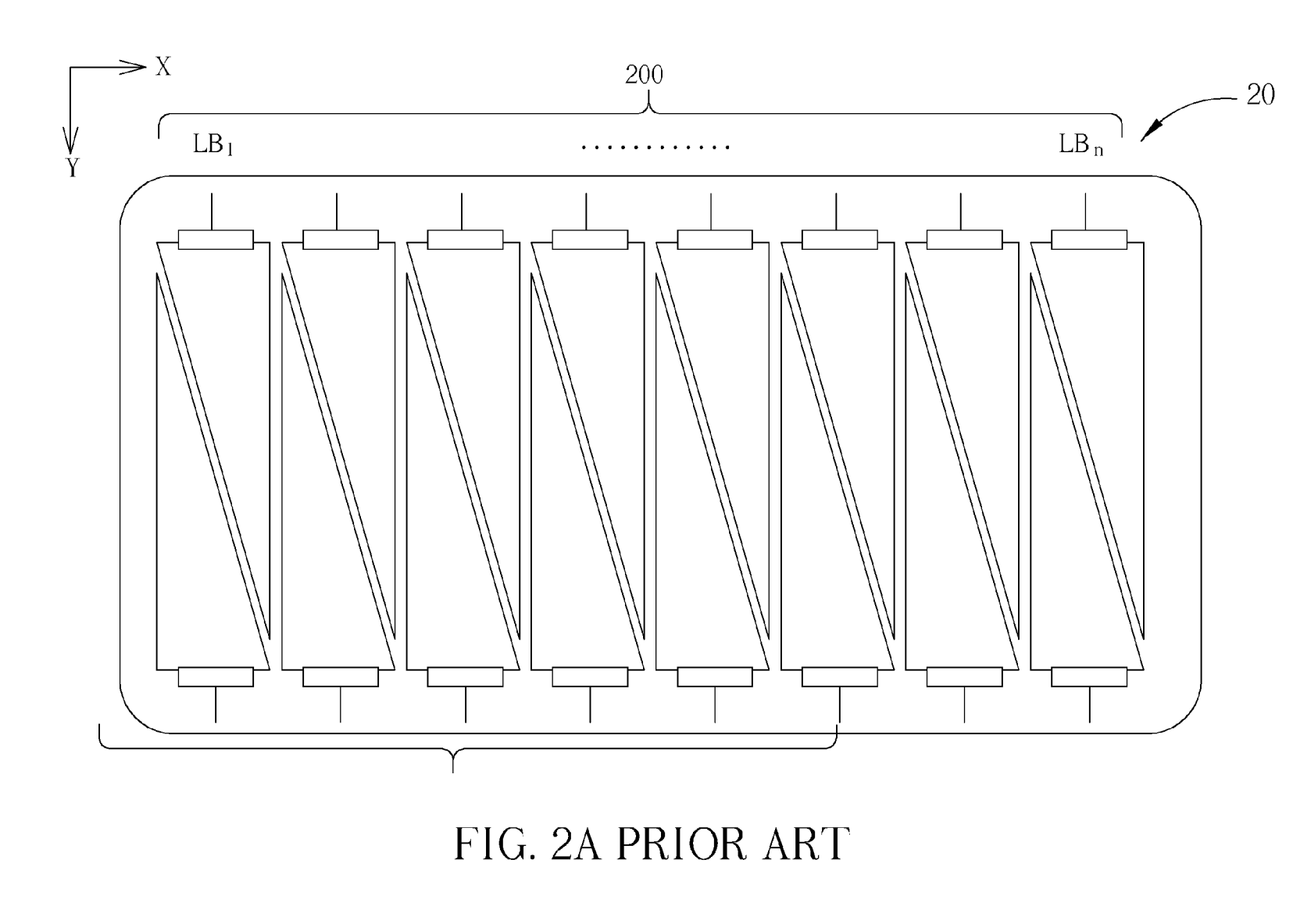
FIG. 2A illustrates a schematic diagram of a conventional capacitive touch control display device.

U.S. Pat. No. 4,087,625 discloses another type of capacitive touch control display device. Please refer to FIG. 2A, which illustrates a schematic diagram of a conventional capacitive touch control display device 20. As shown in FIG. 2A, the sensing array 200 is realized by single-layer pair triangles. The structure of the pair triangles provides a solution simplifying the two-layer sensing array into a single-layer sensing array. By utilizing the single-layer sensing array, a complex production process can be simplified, and production costs effectively controlled.

Figure 2B:
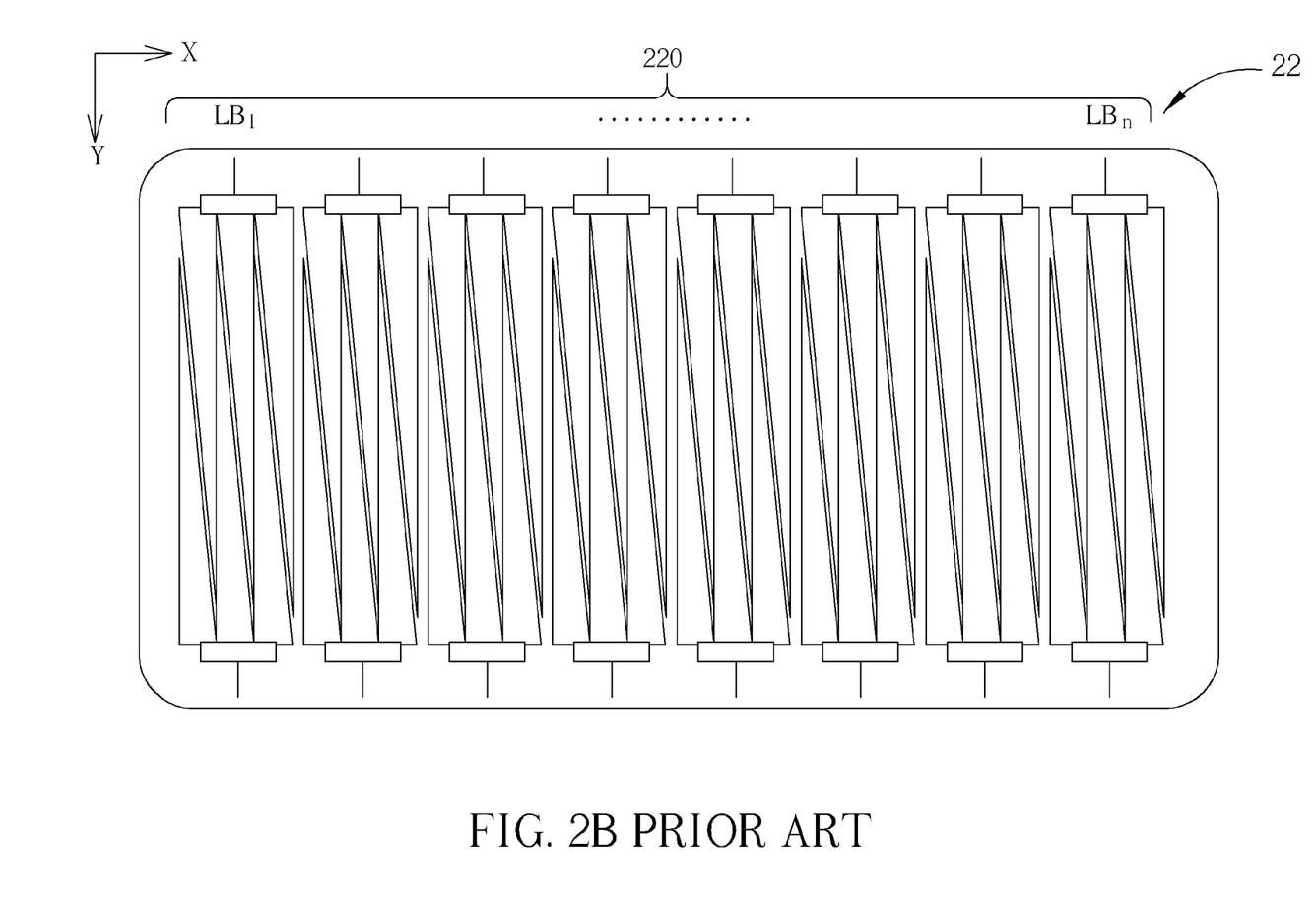
FIG. 2B illustrates a schematic diagram of a conventional capacitive touch control display device.

Furthermore, U.S. Patent Publication Number 2010/0309167 A1 discloses another two-dimensional coordinate multi-touch design. Please refer to FIG. 2B, which illustrates a schematic diagram of a conventional capacitive touch control display device 22. In comparison with the capacitive touch control display device 20 in FIG. 2A, the capacitive touch control display device 22 adjusts number of pair triangles to realize the single-layer sensing array structure as shown in FIG. 2B, where three pairs of triangles are provided to form the sensing capacitance array 220, which simplifies the two-dimensional coordinate to a one-dimensional coordinate to realize multi-touch design.

The structure of the single-layer Indium Tin Oxide of the capacitive touch control display device has been simplified to the one-dimensional coordinate multi-touch design. Thus, an important following issue is to provide better sensing accuracy and positioning efficiency, so as to enlarge applicable ranges of different numbers of Indium Tin Oxide sensing arrays.

SUMMARY OF THE INVENTION

It is therefore an objective to provide a multi-touch positioning method.

A multi-touch positioning method is disclosed for a touch control device, wherein the touch control device comprises a plurality of sensing channels and each of the plurality of sensing channels is interlaced by a first sensing electrode and a second sensing electrode. The multi-touch positioning method includes retrieving a first touch sensing value and a second touch sensing value respectively corresponding to the first sensing electrode and the second sensing electrode of each of the sensing channels, adding the first touch sensing value and the second touch sensing value to generate a sensing sum value corresponding to each sensing channels, determining a touch sensing channel having a local maximum value according to the plurality of sensing sum values of the plurality of the sensing channels, so as to define a touch point on the touch sensing channel, and calculating a coordinate of the touch point according to the first touch sensing value, the second touch sensing value, the sensing sum value and a coordinate according to the touch sensing channel and its neighboring sensing channels.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
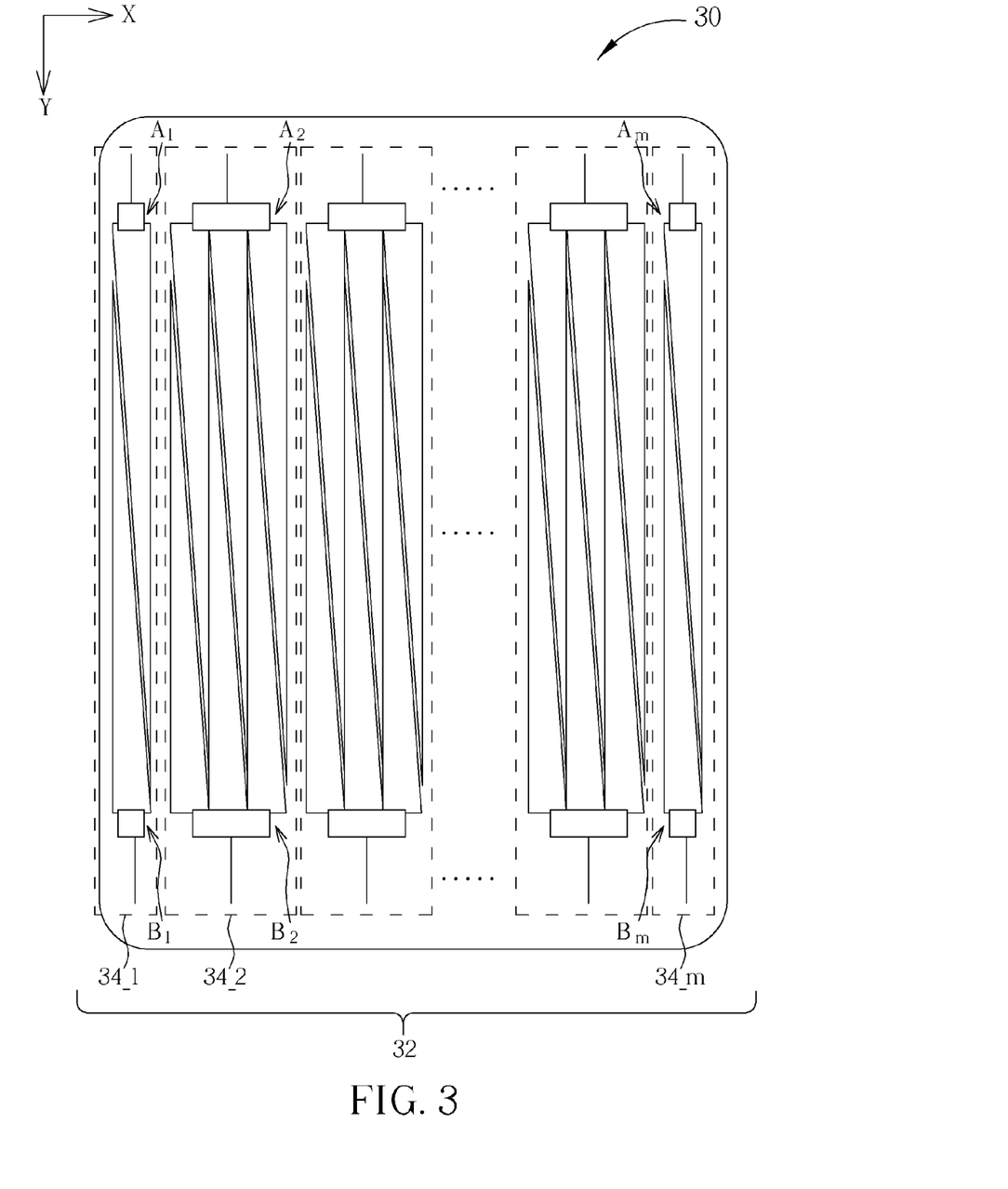
FIG. 3 illustrates a schematic diagram of a single-layer capacitive touch control display device.

Please refer to FIG. 3, which illustrates a schematic diagram of a single-layer capacitive touch control display device 30 according to an embodiment of the invention. As shown in FIG. 3, a sensing capacitance array 32 includes sensing channels 34_1-34_m interleaved with each other with electrical isolation. In the single-layer capacitive touch control display device 30, each sensing channel includes a first sensing electrode and a second sensing electrode, i.e. the sensing channel 341 includes the first sensing electrode $A_1$ and the second sensing electrode $B_1$, and the sensing channel 34_2 includes the first sensing electrode $A_2$ and the second sensing electrode $B_2$, and so on. Preferably, both of the first sensing electrode and the second sensing electrode corresponding to the same sensing channel form a pair triangle relationship. The first sensing electrode and the second sensing electrode of each of the sensing channels are realized by the single-layer Indium Tin Oxide, which is not an emphasis of the invention, and is not described hereinafter for simplicity.

To improve those edge areas of the touch control panel having non-uniform effect in the single-layer capacitive touch control display device, the single-layer capacitive touch control display device 30 combines different amounts of pair triangles to realize the single-layer sensing capacitance array 32, so as to enhance efficiency and accuracy of the sensing capacitance array 32 for retrieving signals. For example, the first sensing electrode and the second sensing electrode are realized by one pair of triangles at the edge area, as shown in FIG. 3, which means the first sensing electrode $A_1(A_m)$ and the second sensing electrode $B_1(B_m)$ of the first sensing channel 34_1(34_m) are one pair of triangles. The rest of the first sensing electrodes and the second sensing electrodes are realized by three pairs of triangles, which means the first sensing electrode $A_2$ and the second sensing electrode $B_2$ of the first sensing channel 34_2 are three pairs of triangles. However, the mentioned pairs of triangles are just examples for descriptions, and are not limited hereinafter.

Figure 4:
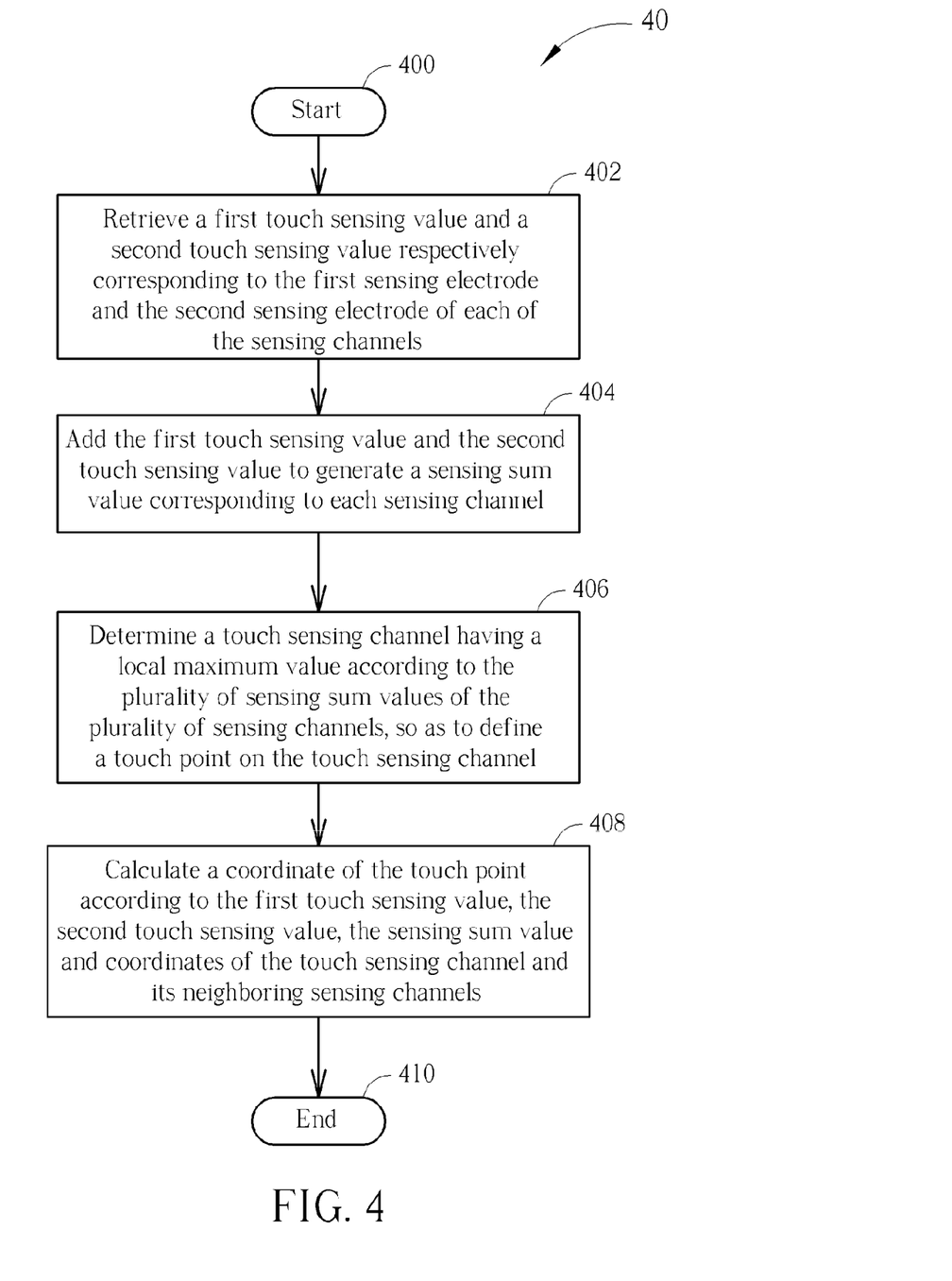
FIG. 4 illustrates a flow chart of a multi-touch positioning process according to an embodiment of the invention.

In this embodiment, the single-layer capacitive touch control display device 30 utilizes the sensing channels 34_1-34_m of the sensing capacitance array 32 to detect capacitor changes (i.e. touch control sensing value) of the sensing electrode, to determine where the touch point is. Therefore, the multi-touch positioning method in this embodiment is utilized for the single-layer capacitive touch control display device 30, and further can be summarized as a multi-touch positioning process 40, as shown in FIG. 4. The multi-touch positioning process 40 includes the following steps:

Step 400: Start.

Step 402: Retrieve a first touch sensing value and a second touch sensing value respectively corresponding to the first sensing electrode and the second sensing electrode of each of the sensing channels.

Step 404: Add the first touch sensing value and the second touch sensing value to generate a sensing sum value corresponding to each sensing channel.

Step 406: Determine a touch sensing channel having a local maximum value according to the plurality of sensing sum values of the plurality of sensing channels, so as to define a touch point on the touch sensing channel.

Step 408: Calculate a coordinate of the touch point according to the first touch sensing value, the second touch sensing value, the sensing sum value and coordinates of the touch sensing channel and its neighboring sensing channels.

Step 410: End.

First, in Step 402, when the user presses the single-layer capacitive touch control display device 30, the first sensing electrodes $A_1$-$A_m$ and the second sensing electrodes $B_1$-$B_m$ sense different touch control sensing values according to different pressing conditions respectively. Thus, in Step 402, the first touch sensing values $SA_1$-$SA_m$ corresponding to the first sensing electrode of each of the sensing channels 34_1-34_m and the second touch sensing values $SB_1$-$SB_m$ corresponding to the second sensing electrode of each of the sensing channels 34_1-34_m are retrieved.

Next, in Step 404, for each of the sensing channels, the first touch sensing value and the second touch sensing value retrieved from Step 402 are added, so as to generate the sensing sum value corresponding to each sensing channel. For example, the sensing sum value $SUM_1$ of the sensing channel 34_1 corresponds to adding the first touch sensing value of the first sensing electrode $A_1$ and the second touch sensing value of the second sensing electrode $B_1$, and the sensing sum value $SUM_2$ of the sensing channel 34_2 corresponds to adding the first touch sensing value of the first sensing electrode $A_2$ and the second touch sensing value of the second sensing electrode $B_2$, and so on. In Step 404, the sensing sum values $SUM_1$-$SUM_m$ corresponding to the sensing channels 34_1-34_m are calculated accordingly.

In Step 406, the touch sensing channel having the local maximum value is determined according to the sensing sum values of the sensing channels 34_1-34_m. In detail, the sensing sum values $SUM_1$-$SUM_m$ obtained from Step 404 are compared with a touch threshold value. When one of the sensing sum values of the sensing channels is larger than the touch threshold value, the sensing channel is determined to be a candidate touch sensing channel. When a touching event occurs, the touch sensing value of the sensing electrode will be much larger than when there is no touching event. Thus, the candidate touch sensing channel more likely to experience touching events could be selected via the touch threshold value. In other words, all the sensing channels qualified as having the sensing sum value larger than the touch threshold value are found, and the sensing channels are determined as the candidate touch sensing channels.

Moreover, for each of the selected candidate touch sensing channels, the candidate touch sensing channel is determined to be the touch sensing channel having the local maximum value if the neighboring sensing channels of the candidate touch sensing channel have no other candidate touch sensing channels. If there are other candidate touch sensing channels surrounded by each other, which means one of the neighboring sensing channels of the candidate touch sensing channel has other candidate touch sensing channels surrounding it, the sensing sum value of the candidate touch sensing channel should be individually compared with the sensing sum values of the neighboring candidate sensing channels, so as to determine the candidate touch sensing channel having the corresponding sensing sum value larger than the neighboring candidate sensing channels as the touch sensing channel having the local maximum value. In other words, the touch sensing channel having local maximum value and selected from Step 406 can be regarded as the touch sensing channel experiencing a touching event already, so as to define a touch point on the touch sensing channel. Certainly, numbers of the touch sensing channel can be one or more than one, which will change according to the number of touching events occurring. In addition, number of the candidate touch sensing channels is not limited hereinafter. Once the touch sensing channel(s) has (have) been determined to have the local maximum value, the touch sensing channel(s) is (are) preset for the following positioning process.

In Step 408, the touch sensing channel obtained from Step 406 is utilized for calculating the coordinate of the touch point, to retrieve the first touch sensing value, the second touch sensing value, the sensing sum value and the coordinate of the touch sensing channel and its neighboring sensing channels. In the embodiment, the sensing sum values and the coordinates of the touch sensing channel and its neighboring sensing channels are utilized for calculating a horizontal direction (X-axis) coordinate via the center of gravity method. Similarly, the sensing sum values and the coordinates of the touch sensing channel and its neighboring sensing channels are utilized for calculating a vertical direction (Y-axis) coordinate via the center of gravity method. As a result, the horizontal direction coordinate and the vertical direction coordinate of the touch point are obtained respectively. Through Step 402 to Step 406, all the touch sensing channels possibly having the touch points are found, so as to calculate all the touch points according to each of the touch sensing channels in Step 408. The purpose of accurate positioning of multi-touch points is performed via the multi-touch positioning process 40.

Figure 5:
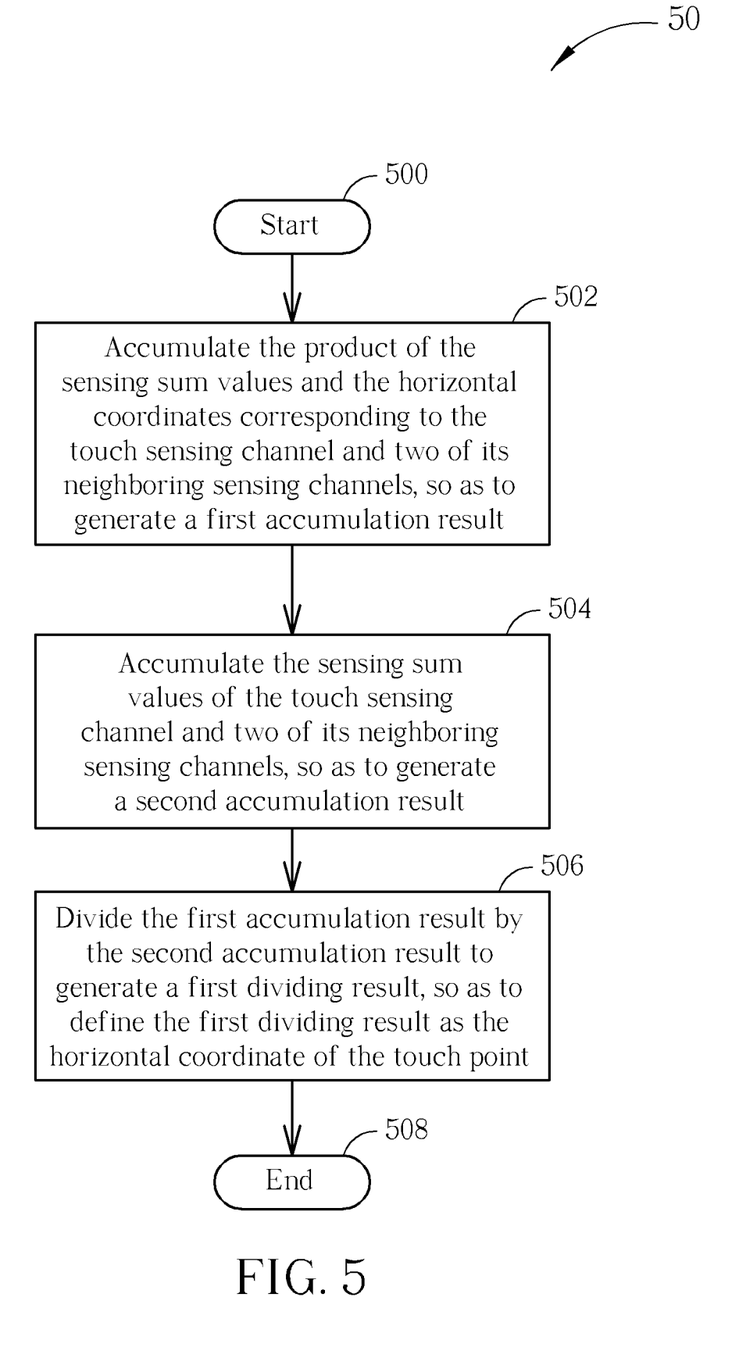
FIG. 5 illustrates a flow chart of a multi-touch horizontal coordinate positioning process according to an embodiment of the invention.

Further, it can be shown in FIG. 5 that the sensing sum values and the coordinates of the touch sensing channel and its neighboring sensing channels are utilized for calculating the horizontal direction (X-axis) coordinate via the center of gravity method. Please refer to FIG. 5, which illustrates a schematic diagram of a multi-touch horizontal coordinate positioning process 50. The multi-touch horizontal coordinate positioning process 50 includes the following steps:

Step 500: Start.

Step 502: Accumulate the product of the sensing sum values and the horizontal coordinates corresponding to the touch sensing channel and two of its neighboring sensing channels, so as to generate a first accumulation result.

Step 504: Accumulate the sensing sum values of the touch sensing channel and two of its neighboring sensing channels, so as to generate a second accumulation result.

Step 506: Divide the first accumulation result by the second accumulation result to generate a first dividing result, so as to define the first dividing result as the horizontal coordinate of the touch point.

Step 508: End.

In the horizontal direction (X-axis), the sensing channels 34_1-34_m individually have their horizontal coordinates, which are separated from each other by the same distance, such as the common difference of 32 of the arithmetic series. The multi-touch horizontal coordinate positioning process 50 is utilized for calculating the X-axis coordinate of the touch point, and the related numbers can be inputted into the center of gravity formula (1) to achieve greater accuracy of the horizontal coordinate of the touch point.

$$x_i = \frac{\sum_{n=i-1}^{i+1} SUM_n X_n}{\sum_{l=i-1}^{i+1} SUM_l} \quad (1)$$

As shown from the above, the symbol i represents the ordinal number of the touch sensing channel (i.e. i=5 if the sensing channel 34_5 is selected as the touch sensing channel), and the symbol $x_i$ represents the horizontal coordinate of the touch point.

In detail, the calculating process of the center of gravity method is to retrieve the horizontal coordinate and the sensing sum value of the touch sensing channel and the horizontal coordinates and the sensing sum values of two neighboring sensing channels of the touch sensing channel simultaneously. Additionally, the product of the sensing sum values and the horizontal coordinates of the touch sensing channel and two of its neighboring sensing channels is accumulated, so as to generate the first accumulation result (i.e. the product of the sensing sum values and the horizontal coordinates is accumulated). Then, the sensing sum values of the touch sensing channel and two of its neighboring sensing channels are accumulated, so as to generate the second accumulation result (i.e. the sensing sum values are accumulated). Last, the first accumulation result is divided by the second accumulation result to generate the first dividing result, so as to define the first dividing result as the horizontal coordinate of the touch point.

Figure 6:
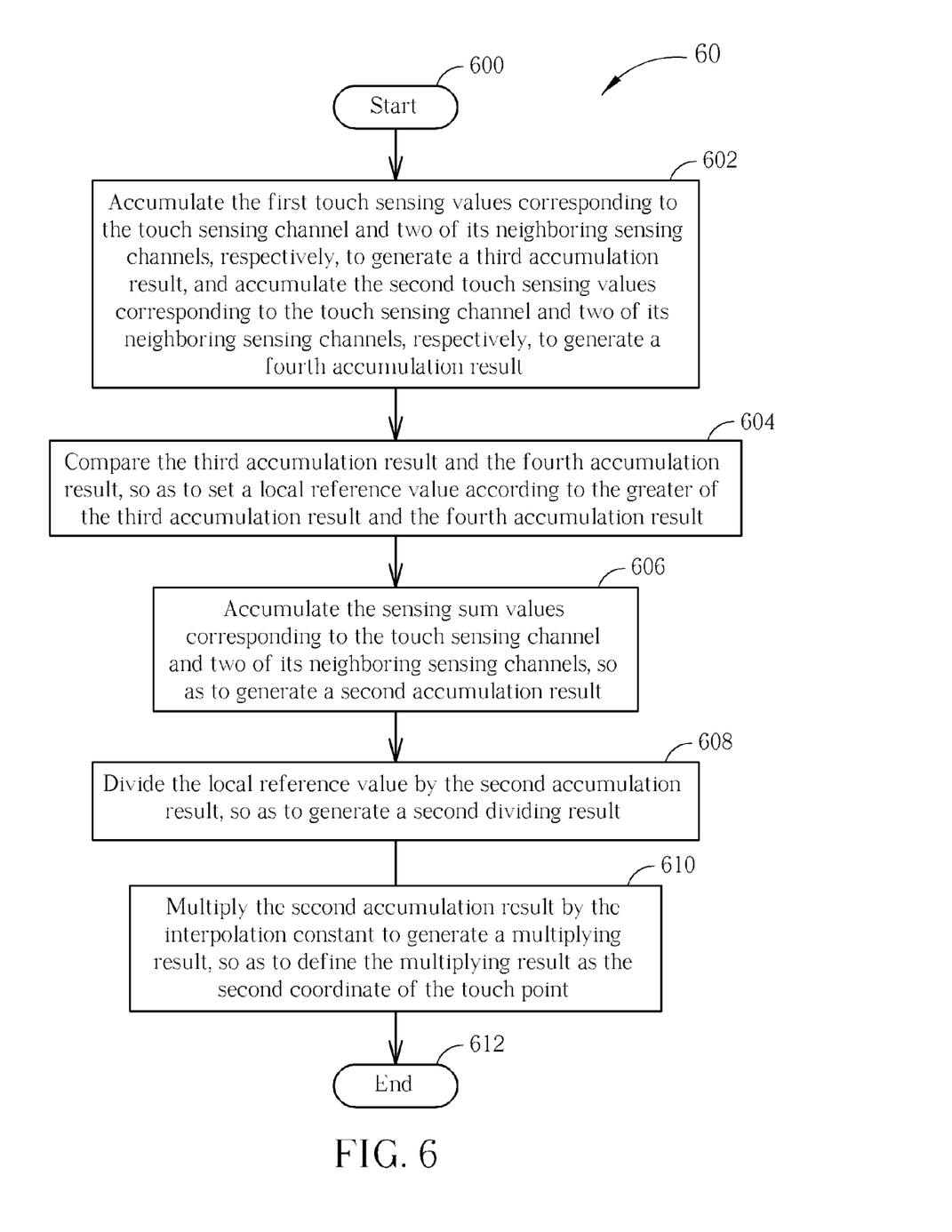
FIG. 6 illustrates a flow chart of a multi-touch vertical coordinate positioning process according to an embodiment of the invention.

Similarly, it can be shown in FIG. 6 that the sensing sum values of the touch sensing channel and its neighboring sensing channels and an interpolation constant are utilized for calculating the vertical direction (Y-axis) coordinate via the center of gravity method. Please refer to FIG. 6, which illustrates a schematic diagram of a multi-touch vertical coordinate positioning process 60. The multi-touch vertical coordinate positioning process 60 includes the following steps:

Step 600: Start.

Step 602: Accumulate the first touch sensing values corresponding to the touch sensing channel and two of its neighboring sensing channels, respectively, to generate a third accumulation result, and accumulate the second touch sensing values corresponding to the touch sensing channel and two of its neighboring sensing channels, respectively, to generate a fourth accumulation result.

Step 604: Compare the third accumulation result and the fourth accumulation result, so as to set a local reference value according to the greater of the third accumulation result and the fourth accumulation result.

Step 606: Accumulate the sensing sum values corresponding to the touch sensing channel and two of its neighboring sensing channels, so as to generate a second accumulation result.

Step 608: Divide the local reference value by the second accumulation result, so as to generate a second dividing result.

Step 610: Multiply the second accumulation result by the interpolation constant to generate a multiplying result, so as to define the multiplying result as the second coordinate of the touch point.

Step 612: End.

The multi-touch vertical coordinate positioning process 60 is utilized for calculating the Y-axis coordinate of the touch point, which is similar to the calculating process used for calculating the horizontal coordinate of the touch point. Based on the touch sensing channel, the first touch sensing values, the second touch sensing values, the sensing sum values corresponding to the touch sensing channel and its neighboring sensing channels and the interpolation constant can be inputted into the center of gravity formula (2) to achieve greater accuracy of the vertical coordinate of the touch point.

$$y_i = \frac{LR}{\sum_{l=i-1}^{i+1} SUM_l} * Y_{res} \quad (2)$$

In the above, the symbol i represents the ordinal number of the touch sensing channel (i.e. i=5 if the sensing channel 34_5 is selected as the touch sensing channel), the symbol $y_i$ represents the vertical coordinate of the touch point, the symbol LR represents the local reference value, and the symbol $Y_{res}$ represents the interpolation constant.

When $\sum_{n=i-1}^{i+1} A_n > \sum_{n=i-1}^{i+1} B_n$, then $LR = \sum_{n=i-1}^{i+1} A_n$.

When $\sum_{n=i-1}^{i+1} B_n > \sum_{n=i-1}^{i+1} A_n$, then $LR = \sum_{n=i-1}^{i+1} B_n$.

In detail, the multi-touch vertical coordinate positioning process 60 is utilized to retrieve the sensing sum value, the first touch sensing value and the second touch sensing value of the touch sensing channel and the sensing sum values, the first touch sensing values and the second touch sensing values of two neighboring sensing channels of the touch sensing channel simultaneously. Next, the first touch sensing values corresponding to the touch sensing channel and two of its neighboring sensing channels are accumulated, respectively, to generate the third accumulation result, and the second touch sensing values corresponding to the touch sensing channel and two of its neighboring sensing channels are accumulated, respectively, to generate the fourth accumulation result. Then, the third accumulation result and the fourth accumulation result are compared, so as to set the local reference value according to the greater of the third accumulation result and the fourth accumulation result. In other words, possibility of the touch point is determined according to the third accumulation result and the fourth accumulation result. When the third accumulation result is larger than the fourth accumulation result, it means the touch point is close to one side of the first sensing electrode. On the other hand, when the third accumulation result is smaller than the fourth accumulation result, it means the touch point is close to one side of the second sensing electrode. After such comparison, the local reference value is set to be the larger of the third accumulation result and the fourth accumulation result. For example, if the third accumulation result is larger than the fourth accumulation result, the third accumulation result is set to be the local reference value. If the fourth accumulation result is larger than the third accumulation result, the fourth accumulation result is set to be the local reference value. Under such circumstances, the local reference value provides further information to determine whether the touch point is close to the first sensing electrode (top-side of the sensing capacitance array 32) or the second sensing electrode (bottom-side of the sensing capacitance array 32), so as to enhance calculating accuracy of the vertical coordinate of the touch point. Next, the sensing sum values corresponding to the touch sensing channel and two of its neighboring sensing channels are accumulated, so as to generate the second accumulation result (similar to Step 504), and the local reference value is divided by the second accumulation result, so as to generate the second dividing result. Last, the second accumulation result is multiplied by the interpolation constant to generate the multiplying result, so as to define the multiplying result as the second coordinate of the touch point, wherein the multiplying result is the vertical coordinate of the touch point.

Noticeably, in this embodiment of the invention, only one sensing channel on the left hand or the right hand of the touch sensing channel is selected to calculate the horizontal coordinate or the vertical coordinate of the touch point for better calculating efficiency, which is not limited hereinafter. Those skilled in the art can select different numbers of sensing channels for input into the center of gravity method, the interpolation method or other similar calculating formula to calculate the horizontal coordinate and the vertical coordinate of the touch point.

In short, the multi-touch positioning process 40 first determines the touch sensing channel having the local maximum value as the reference basis of the center of the gravity method, and considers two neighboring sensing channels of the touch sensing channel to retrieve the related numbers, such as the horizontal coordinate, the first touch sensing value, the second touch sensing value, the sensing sum value and the interpolation constant for input into the center of the gravity method for obtaining the horizontal coordinate and the vertical coordinate of the touch point.

Figure 7A:
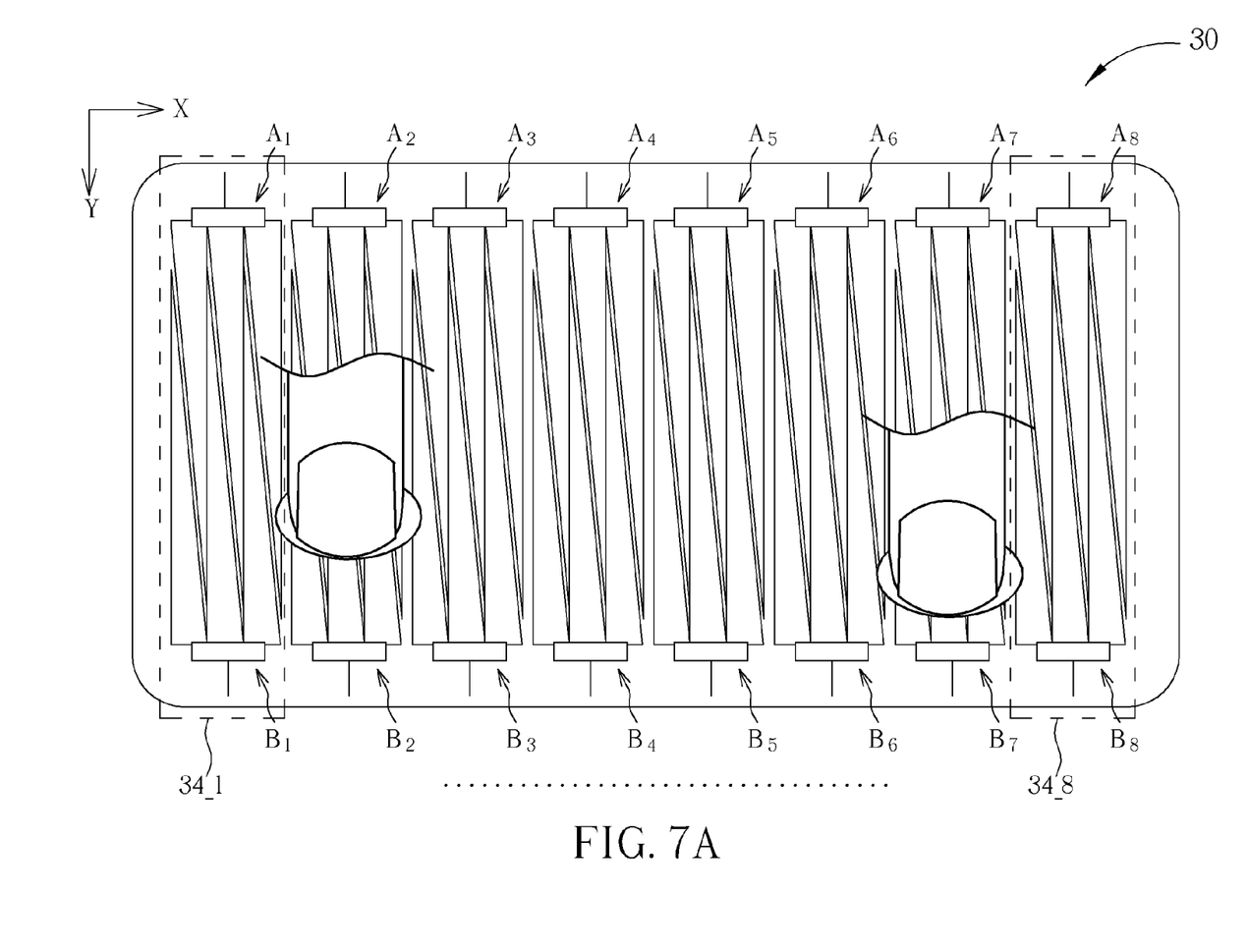
FIG. 7A illustrates a schematic diagram of the single-layer capacitive touch control display device pressed by a user.
Figure 7B:
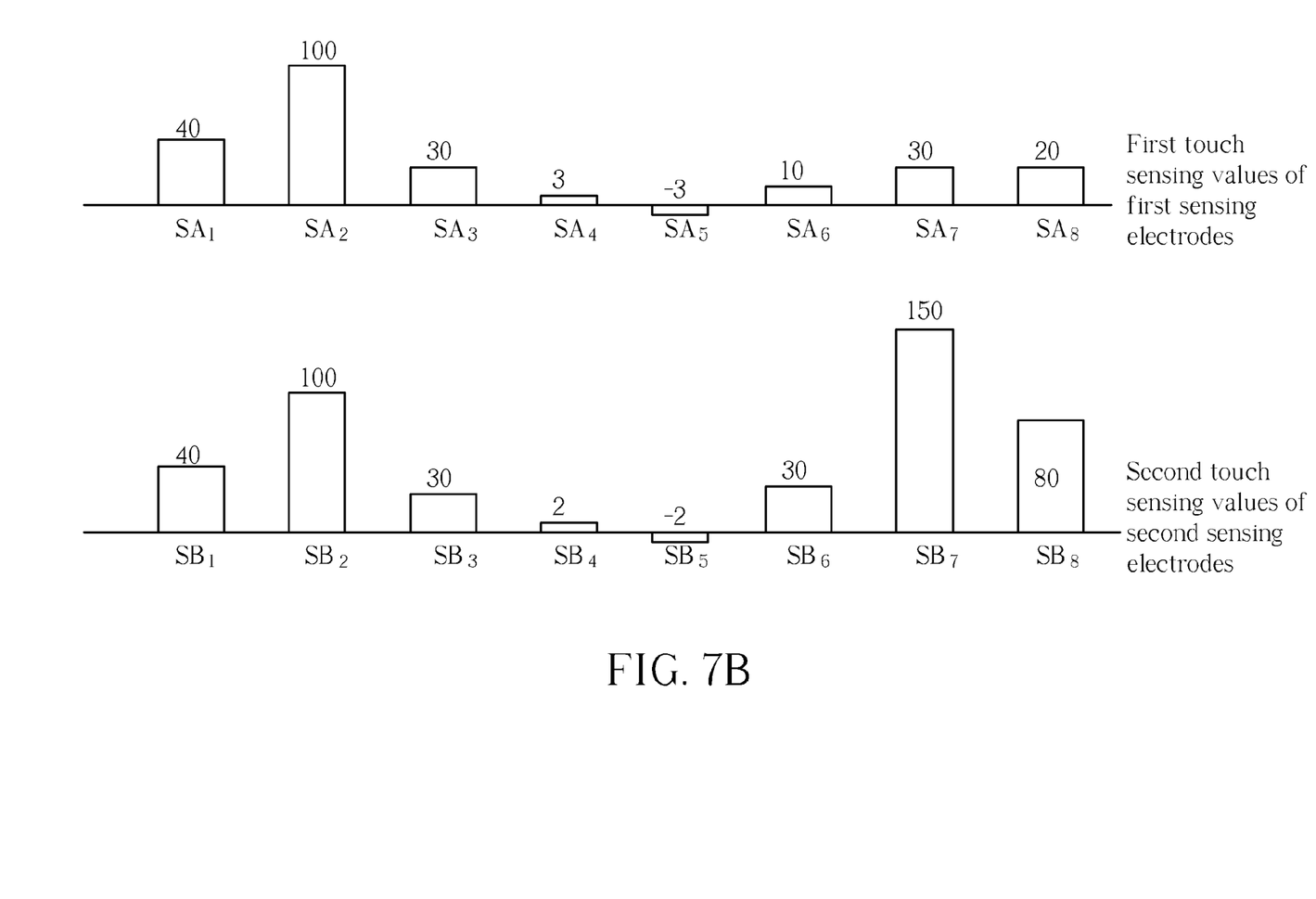
FIG. 7B illustrates a schematic diagram of the sensing condition of the first sensing electrodes and the second sensing electrodes of the single-layer capacitive touch control display device.

The following is an example of two touch points. Please refer to FIGS. 7A and 7B, where FIG. 7A illustrates a schematic diagram of the single-layer capacitive touch control display device 30 pressed by a user, and FIG. 7B illustrates a schematic diagram of the sensing condition of the first sensing electrodes $A_1$-$A_8$ and the second sensing electrodes $B_1$-$B_8$ of the single-layer capacitive touch control display device 30. For convenience, the single-layer capacitive touch control display device 30 is supposed to have 8 sensing channels 34_1-34_8 and their corresponding first sensing electrodes $A_1$-$A_8$ and second sensing electrodes $B_1$-$B_8$, where the first sensing electrodes $A_1$-$A_8$ and the second sensing electrodes $B_1$-$B_8$ are realized by three pairs of triangles. The two fingers (i.e. multi-touch points) in FIG. 7A represent the practical touching event. The touch sensing values retrieved by each of the sensing channels are the following: the first touch sensing values $SA_1$-$SA_8$ of the first sensing electrodes $A_1$-$A_8$ are 40, 100, 30, 3, −3, 10, 30 and 20, and the second touch sensing values $SB_1$-$SB_8$ of the second sensing electrodes $B_1$-$B_8$ are 40, 100, 30, 2, −2, 30, 150 and 80. Please refer to FIG. 8, which illustrates a schematic diagram of accumulation of the sensing sum value of the first touch sensing values and the second touch sensing values shown in FIG. 7B. Those sensing sum values $SUM_1$-$SUM_8$ corresponding to the sensing channels 34_1-34_8 are 80, 200, 60, 5, −5, 40, 180 and 100, where $SUM_1=SA_1+SB_1=40+40=80$, $SUM_2=SA_2+SB_2=100+100=200$, and so on. Additionally, the sensing channels 34_1-34_8 have horizontal coordinates $X_1$-$X_8$ of 16, 48, 80, 112, 144, 176, 208 and 240, which means the sensing channels are an equal horizontal coordinate interval away from each other of $\Delta X=32$.

According to the process 40, the touch threshold value is preset to be 80, and the sensing sum values $SUM_1$-$SUM_8$ corresponding to the sensing channels 34_1-34_8 are 80, 200, 60, 5, −5, 40, 180 and 100. Then, the sensing sum values $SUM_1$-$SUM_8$ are individually compared with the touch threshold value, so as to determine whether or not an effective pressing event or noise occurs. Under such circumstances, the sensing sum values $SUM_2$, $SUM_7$ and $SUM_8$ are 200, 180 and 100, which are larger than the touch threshold value. Therefore, the sensing channels 34_2, 34_7 and 34_8 are selected as the candidate touch sensing channels. Since two neighboring sensing channels of the sensing channel 34_2 are not the candidate touch sensing channel, the sensing channel 34_2 is determined to be the touch sensing channel having the local maximum value. The sensing channels 34_7 and 34_8 are close to each other, and, therefore, there is a need to compare the sensing sum values $SUM_7$ and $SUM_8$ with each other. Accordingly, the sensing channels 34_7 having larger value is then selected to be the touch sensing channel having the local maximum value. Therefore, there are two touch sensing channels in this embodiment, which means both of the touch sensing channels have their touch points. It is supposed that the touch point T_2 is located on the sensing channel 34_2 with its coordinate ($x_2$, $y_2$) and the touch point T_7 is located on the sensing channel 34_7 with its coordinate ($x_7$, $y_7$).

Figure 8:
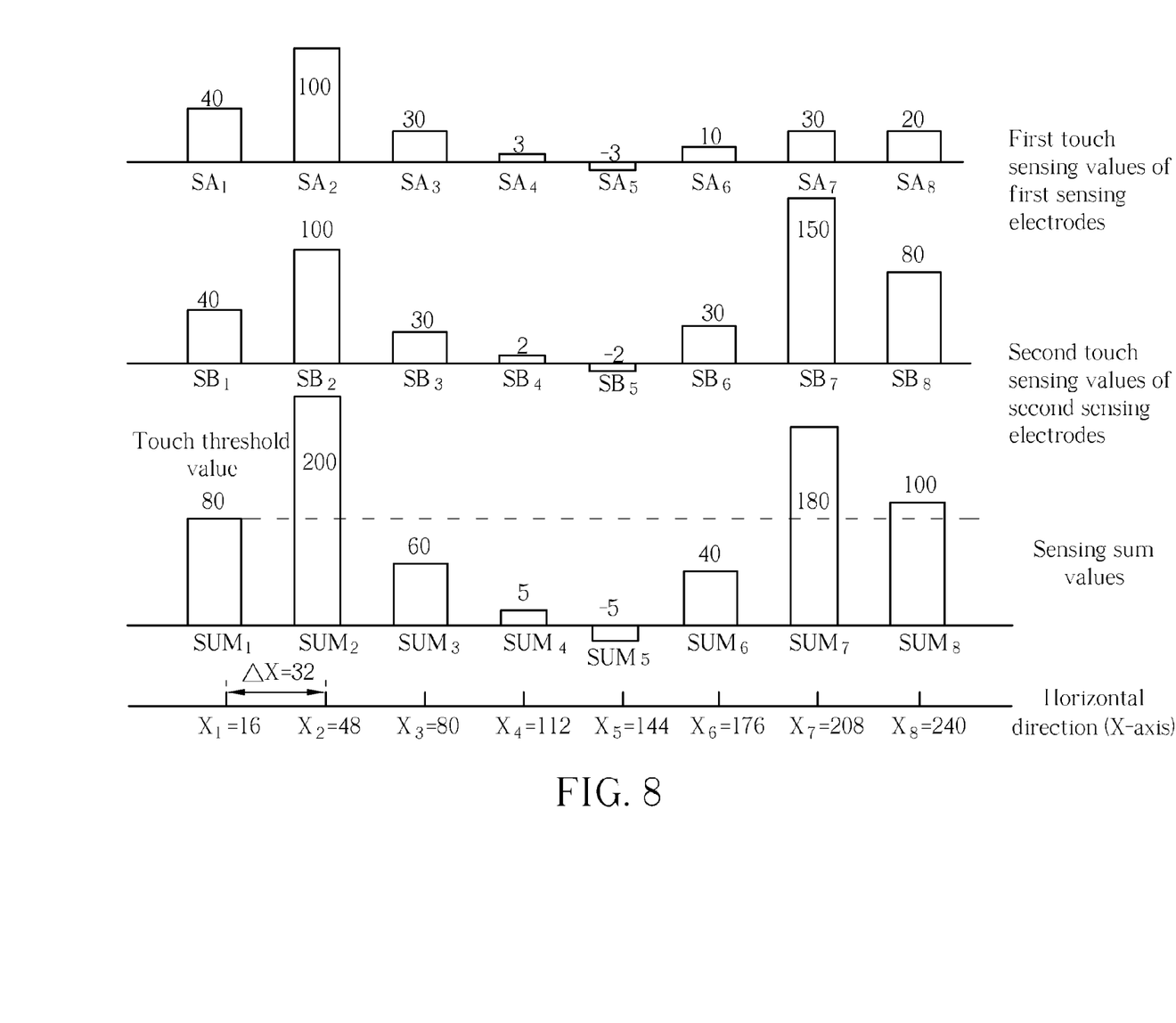
FIG. 8 illustrates a schematic diagram of accumulation of the sensing sum value of the first touch sensing values and the second touch sensing values shown in FIG. 7B.

First of all, the horizontal coordinates of the touch sensing channels of the touch points T_2 and T_7 are calculated. As shown in FIG. 8, the sensing channel 34_2 has the horizontal coordinate $X_2$ of 48 and the sensing sum value $SUM_2$ equaling 200, and the sensing channel 34_7 has the horizontal coordinate $X_7$ of 208 and the sensing sum value $SUM_7$ equaling 180. The sensing channel 34_2 has the two neighboring sensing channels 34_1, 34_3, which have the corresponding horizontal coordinates $X_1$=48 and $X_3$=80 and the sensing sum values $SUM_1$=80 and $SUM_3$=60. The sensing channel 34_7 has the two neighboring sensing channels 34_6, 34_8, which have the corresponding horizontal coordinates $X_6$=176 and $X_8$=240 and the sensing sum values $SUM_6$=40 and $SUM_8$=10. By using the formula (1), the touch point T_2 is calculated to have the horizontal coordinate $X_2$=46, and the touch point T_7 is calculated to have the horizontal coordinate $X_7$=214 as follows:

$$x_2 = \frac{\sum_{n=2-1}^{2+1} C_n X_n}{\sum_{l=2-1}^{2+1} C_l} = \frac{(80 \times 16 + 200 \times 48 + 60 \times 80)}{(80 + 200 + 60)} = 46$$

$$x_7 = \frac{\sum_{n=7-1}^{7+1} C_n X_n}{\sum_{l=7-1}^{7+1} C_l} = \frac{(40 \times 176 + 180 \times 208 + 80 \times 240)}{(40 + 180 + 100)} = 214$$

Further, the vertical coordinates of the touch sensing channels of the touch points T_2 and T_7 are calculated. As shown in FIG. 8, the sensing channel 34_2 has the sensing sum value $SUM_2$ of 200, and the sensing channel 34_7 has the sensing sum value $SUM_7$ of 180. First, the sum of the first touch sensing values of the sensing channel 34_2 and its two neighboring sensing channels 34_1 and 34_3 is calculated to be 170 (i.e. 40+100+30=170), and the sum of the second touch sensing values of the sensing channel 34_2 and its two neighboring sensing channels 34_1 and 34_3 is calculated to be 170 (i.e. 40+100+30=170). Both are the same, and the local reference value LR of the touch point T_2 is set to be 170. Similarly, the sum of the first touch sensing values of the sensing channel 34_7 and its two neighboring sensing channels 34_6 and 34_8 is calculated to be 60 (i.e. 10+30+20=60), and the sum of the second touch sensing values of the sensing channel 34_7 and its two neighboring sensing channels 34_6 and 34_8 is calculated to be 260 (i.e. 30+150+80=260). Thus, the local reference value LR of the touch point T_7 is set to be 260. If the interpolation constant $Y_{res}$ is 256, the vertical coordinate of the touch point T_2 can be calculated via the formula (2) to be $y_2$=128, and the vertical coordinate of the touch point T_7 can be $y_7$=208, as follows:

$$y_2 = \frac{\sum_{n=2-1}^{2+1} B_n}{\sum_{l=2-1}^{2+1} C_l} * Y_{res} = \frac{(40 + 100 + 30)}{(80 + 200 + 60)} = 128$$

$$y_7 = \frac{\sum_{n=7-1}^{7+1} B_n}{\sum_{l=7-1}^{7+1} C_l} * Y_{res} = \frac{(30 + 150 + 80)}{(40 + 180 + 100)} = 208$$

From the above, the touch point T_2 of the sensing channel 34_2 has the coordinates (48,128), and the touch point T_7 of the sensing channel 34_7 has the coordinates (214,208). In brief, two touch points on the single-layer capacitive touch control display device 30 can be easily and accurately calculated via the mentioned multi-touch positioning method.

Moreover, the single-layer capacitive touch control display device 30 can further install a filter to process the horizontal coordinate and the vertical coordinate. For example, a low-pass filter is utilized to eliminate an offset effect of the horizontal coordinate and the vertical coordinate. The low-pass filter has the following formula (3):

$$X[n]=(1-\alpha) \cdot X[n-1]+\alpha \cdot x[n]$$

$$Y[n]=(1-\beta) \cdot Y[n-1]+\beta \cdot y[n] \qquad (3)$$

As shown from the above, the symbols $\alpha$ and $\beta$ represent filter coefficients between 0 to 1, the symbol n represents a timing index of a discrete period, the symbols x and y represent input coordinates and the symbols X and Y represent output coordinates. Here, the filter coefficient $\alpha$ is ½ and the horizontal coordinate of the touch point T_2 is used for demonstration to give a timing function of the original input touch horizontal coordinate with x=[46, 48, 45, 44, 46, 47, 46]. After using the formula (3), a timing function of the output touch horizontal coordinate will be X=[46, 47, 46, 45, 45, 46, 46], where an offset of the timing function of the output touch horizontal coordinate can be narrowed down from ±2 to ±1, so as to reduce an error of the touch point coordinate with passing time.

In summary, the multi-touch positioning method of the invention provides a single-layer capacitive touch control display device to determine a coordinate of a touch point accurately to enhance efficiency of calculating the touch point coordinate, so as to enlarge application of the single-layer capacitive touch control display device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-touch positioning method for a touch control device, the touch control device comprising a plurality of sensing channels, each of the plurality of sensing channels being interlaced by a first sensing electrode and a second sensing electrode, the multi-touch positioning method comprising:

retrieving a first touch sensing value and a second touch sensing value respectively corresponding to the first sensing electrode and the second sensing electrode of each of the sensing channels;

adding the first touch sensing value and the second touch sensing value to generate a sensing sum value corresponding to each sensing channel;

determining a touch sensing channel having a local maximum value according to the plurality of sensing sum values of the plurality of sensing channels, so as to define a touch point on the touch sensing channel;

utilizing a center of gravity method to calculate a first coordinate of the touch point according to the sensing sum value and a horizontal coordinate corresponding to the touch sensing channel and its neighboring sensing channels;

accumulating the first touch sensing values corresponding to the touch sensing channel and two of its neighboring sensing channels, respectively, to generate a third accumulation result, and accumulating the second touch sensing values corresponding to the touch sensing channel and two of its neighboring sensing channels, respectively, to generate a fourth accumulation result;

comparing the third accumulation result and the fourth accumulation result, so as to set a local reference value according to the greater of the third accumulation result and the fourth accumulation result;

accumulating the sensing sum values corresponding to the touch sensing channel and two of its neighboring sensing channels, so as to generate a second accumulation result;

dividing the local reference value by the second accumulation result, so as to generate a second dividing result; and multiplying the second accumulation result by an interpolation constant to generate a multiplying result, so as to define the multiplying result as a second coordinate of the touch point.

2. The multi-touch positioning method of claim 1, wherein the step of determining the touch sensing channel having the local maximum value according to the plurality of sensing sum values of the plurality of sensing channels, so as to define the touch point on the touch sensing channel, comprises:

determining at least one candidate touch sensing channel according to the plurality of sensing sum values corresponding to the plurality of sensing channels and a touch threshold value; and selecting the touch sensing channel having the local maximum value from at least one of the candidate touch sensing channels.

3. The multi-touch positioning method of claim 2, wherein the step of determining the at least one candidate touch sensing channel according to the plurality of sensing sum values corresponding to the plurality of sensing channels and the touch threshold value comprises:

comparing the sensing sum value corresponding to the plurality of sensing channels and the touch threshold value, so as to determine the sensing channel as a candidate touch sensing channel when the sensing sum value is larger than the touch threshold value.

4. The multi-touch positioning method of claim 2, wherein the step of selecting the touch sensing channel having the local maximum from the at least one of the candidate touch sensing channels comprises:

comparing the sensing sum values of neighboring sensing channels of the plurality of sensing channels when at least one of the candidate touch sensing channels has other neighboring candidate touch sensing channels, so as to determine a candidate sensing channel having a sensing sum value larger than the two neighboring candidate sensing channels as the touch sensing channel having the local maximum value.

5. The multi-touch positioning method of claim 2, wherein the step of selecting the touch sensing channel having the local maximum from at least one of the candidate touch sensing channels comprises:

for each of the candidate touch sensing channels, determining each of the candidate touch sensing channels as the touch sensing channel having the local maximum value when the neighboring sensing channels have no other candidate touch sensing channels.

6. The multi-touch positioning method of claim 1, wherein the step of utilizing the center of gravity method to calculate the first coordinate of the touch point according to the sensing sum value and the horizontal coordinate corresponding to the touch sensing channel and its neighboring sensing channels comprises:

accumulating the product of the sensing sum values and the horizontal coordinates corresponding to the touch sensing channel and two of its neighboring sensing channels, so as to generate a first accumulation result;

accumulating the sensing sum values of the touch sensing channel and two of its neighboring sensing channels, so as to generate a second accumulation result; and dividing the first accumulation result by the second accumulation result to generate a first dividing result, so as to define the first dividing result as the first coordinate of the touch point.

7. The multi-touch positioning method of claim 1, wherein the touch control device is a single-layer capacitive touch control display device.

8. The multi-touch positioning method of claim 7, wherein the touch control device further comprises a filter to process the first coordinate and the second coordinate.

9. The multi-touch positioning method of claim 8, wherein the filter is a low-pass filter for eliminating an offset effect of the first coordinate and the second coordinate.

\* \* \* \* \*